(12) United States Patent
Ron et al.

(10) Patent No.: US 8,792,692 B2
(45) Date of Patent: Jul. 29, 2014

(54) METHOD AND SYSTEM FOR DETECTING CONTOURS IN AN IMAGE

(75) Inventors: Eldar Ron, Tel-Aviv (IL); Hedva Spitzer, Tel-Aviv (IL)

(73) Assignee: Ramot at Tel-Aviv University Ltd., Tel-Aviv (IL)

( * ) Notice: Subject to any disclaimer, the term of this patent is extended or adjusted under 35 U.S.C. 154(b) by 189 days.

(21) Appl. No.: 13/521,488

(22) PCT Filed: Jan. 11, 2011

(86) PCT No.: PCT/IL2011/000031
§ 371 (c)(1),
(2), (4) Date: Jul. 11, 2012

(87) PCT Pub. No.: WO2011/083480
PCT Pub. Date: Jul. 14, 2011

(65) Prior Publication Data
US 2013/0011029 A1    Jan. 10, 2013

Related U.S. Application Data

(60) Provisional application No. 61/282,264, filed on Jan. 11, 2010.

(51) Int. Cl.
*G06K 9/00* (2006.01)
*G06K 9/48* (2006.01)
(52) U.S. Cl.
USPC ........................... 382/128; 382/165; 382/199
(58) Field of Classification Search
None
See application file for complete search history.

(56) References Cited

FOREIGN PATENT DOCUMENTS

| WO | WO 2004/075535 | 9/2004 |
|---|---|---|
| WO | WO 2011/083480 | 7/2011 |

OTHER PUBLICATIONS

Grigorescu et al ("Contour Detection Based on Non-classical Receptive Field Inhibition", IEEE Transactions on Image Processing, pp. 729-739, Jul. 1, 2003.*
Heitger et al ("A Computational Model of Neural Contour Processing: Figure-Ground Segregation and Illusory Contours", pp. 181-192, Sep. 7, 1994).*
Communication Relating to the Results of the Partial International Search Dated Jun. 15, 2011 From the International Searching Authority Re. Application No. PCT/IL2011/000031.
International Preliminary Report on Patentability Dated Jul. 26, 2012 From the International Bureau of WIPO Re. Application No. PCT/IL2011/000031.
International Search Report and the Written Opinion Dated Oct. 28, 2011 From the International Searching Authority Re. Application No. PCT/IL2011/000031.
Barkan et al. "Brightness Contrast-Contrast Induction Model Predicts Assimilation and Inverted Assimilation Effects", Journal of Vision, XP002659387, 8(7): 1-26, 2008. Abstract, Section 'Model', p. 3-4.

(Continued)

*Primary Examiner* — Amara Abdi

(57) ABSTRACT

A method of processing an image is disclosed. The method comprises: decomposing the image into a plurality of different resolutions; and for each resolution, processing the image at the resolution to extract edge-orientation information; utilizing the edge-orientation information for identifying contours in the image; and transmitting at least the identified contours to a computer-readable medium.

28 Claims, 7 Drawing Sheets

(56) References Cited

OTHER PUBLICATIONS

Chmielewski "Specification of the Evidence Accumulation-Based Line Detection Algorithm. Towards Finding Blood Vessels in Mammograms", Advances in Soft Computing, Proceedings of the International Conference on Computer Recognition Systems, CORES 2005, Rydzyna, Poland, May 22-25, 2005, XP002659388, p. 355-362, May 22, 2005. Retrieved From the Internet. Section 2, Fig.4.

Grigorescu et al. "Contour Detection Based on Nonclassical Receptive Field Inhibition", IEEE Transactions on Image Processing, XP011074414, 12(7): 729-739, Jul. 1, 2003. Abstract, Sections II, III-B.

Heitger et al. "A Computational Model of Neural Contour Processing: Figure-Ground Segregation and Illusory Contours", Proceedings From Perception to Action Conference, PERAC '94, XP010256341, p. 181-192, Sep. 7, 1994. Abstract, Sections 2, 3, Figs.6-10.

Heitger et al. "Simulation of Neural Contour Mechanisms: From Simple to End-Stopped Cells", Cision Research, Computational Vision, XP024308903, Section 3, 32(5): 96-981, May 1, 1992. Abstract, p. 967-969.

Koller et al. "Multiscale Detection of Curvilinear Structures in 2-D and 3-D Image Data", Proceedings of the 5th International Conference on Computer Vision, Cambridge, MA, USA, Jun. 20-23, 1995, XP010146979, p. 864-869, Jun. 1995. Abstract, Section 3.

Ter Haar Romeny "A Scale-Space Model for the Retinal Sampling", Front-End Vision and Multi-Scale Image Analysis, XP002635910, Chap.10-12: 167-213, 2002. Retrieved From the Internet.

Ter Haar Romeny et al. "Front-End Vision: A Multiscale Geometry Engine", Proceedings of the First IEEE International Workshop on Biologically Motivated Computer Vision (BMCV2000), Lecture Notes in Computer Science, XP002635909, 1811: 297-307, May 15, 2000. Section 1.1.

* cited by examiner

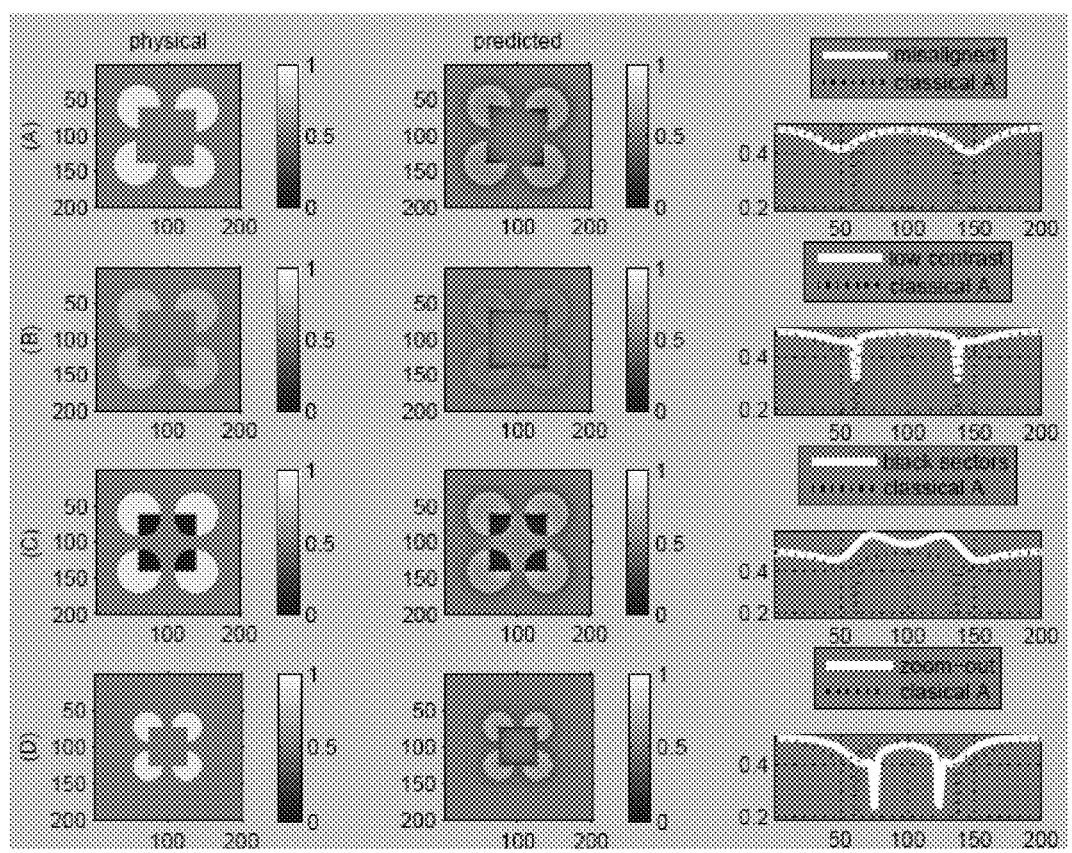
FIGs. 6A-D

METHOD AND SYSTEM FOR DETECTING CONTOURS IN AN IMAGE

RELATED APPLICATIONS

This application is a National Phase of PCT Patent Application No. PCT/IL2011/000031 having International filing date of Jan. 11, 2011, which claims the benefit of priority under 35 USC §119(e) of U.S. Provisional Patent Application No. 61/282,264 filed on Jan. 11, 2010. The contents of the above applications which are all hereby incorporated by reference as if fully set forth herein in their entirety.

FIELD AND BACKGROUND OF THE INVENTION

The present invention, in some embodiments thereof, relates to image processing and, more particularly, but not exclusively, to a method and system for detecting contours in an image.

A great deal of investigatory work and research has been expended in attempting to understand the biological visual system. Apart from the intrinsic value of the knowledge gained by such an understanding, it is hoped that the knowledge gained can be applied to produce man-made machines to simulate the biological visual system by a combination of opto-electronic devices and computer data processing techniques to thereby achieve the efficiency inherent in biological visual systems.

Among the properties of the biological visual system is perceptual grouping. The visual system segments optical input into regions that are separated by perceived contours or boundaries. This rapid, seemingly automatic, early step in visual processing is difficult to characterize, largely because many perceived contours have no obvious correlates in the optical input.

A contour in a pattern in a luminance map (e.g., an image) is generally defined as a spatial discontinuity in luminance. Although usually sufficient, however, such discontinuities are by no means necessary for sustaining perceived contours. Regions separated by visual contours also occur in the presence of: statistical differences in textural qualities (such as orientation, shape, density, or color), binocular matching of elements of differing disparities, accretion and deletion of texture elements in moving displays, and classical "subjective contours". The extent to which the types of such perceived contours involve the same visual processes as those triggered by luminance contours is not obvious, although the former are certainly as perceptually real and generally as vivid as the latter.

The textural segmentation process is exquisitely context-sensitive. That is, a given texture element at a given location can be part of a variety of larger groupings, depending on what surrounds it. Indeed, the precise determination even of what acts as an element at a given location can depend on patterns at nearby locations.

Many computational models of illusory contours have been proposed. Representative examples include Grossberg et al., "Neural Dynamics of Form Perception: Boundary Completion, Illusory Figures, and Neon Spreading," Psychological Review, 92(2), 173-211 (1985); Grossberg et al., "Neural dynamics of perceptual grouping: textures, boundaries, and emergent segmentations," Perception and Psychophysics, 38(2), 141-171 (1985); Heitger et al., "Simulation of neural contour mechanisms: representing anomalous contours," Image and Vision Computing, 16, 407-421 (1998); Gove et al., "Brightness perception, illusory contours, and corticogeniculate feedback," Visual Neuroscience, 12, 1027-1052 (1995); Grossberg et al., "How does the cortex do perceptual grouping?" Trends in Neurosciences, 20(3), 106-111 (1997); S. Grossberg, "Cortical Dynamics of Three-Dimensional Figure-Ground Perception of Two-Dimensional Pictures," Psychological Review, 104(3), 618-658 (1997); Ross et al., "Visual cortical mechanisms of perceptual grouping: interacting layers, networks, columns, and maps," Neural Networks, 13, 571-588 (2000); Heitger et al., "Simulation of Neural Contour Mechanisms—from Simple to End-Stopped Cells," Vision Res. 32, 963-981 (1992); F. Heitger, "A computational model of neural contour processing: Figure—ground segregation and illusory contours," The Proceedings of the Seventh IEEE International Conference on Computer Vision 93, 32 (1999); Peterhans et al., "Simulation of neuronal responses defining depth order and contrast polarity at illusory contours in monkey area V2," J. Comput Neurosci. 10, 195-211 (2001); and Finkel et al., "Integration of Distributed Cortical Systems by Reentry—a Computer-Simulation of Interactive Functionally Segregated Visual Areas," J. Neurosci. 9, 3188-3208 (1989).

The above publications are inspired by physiological mechanisms, such as the receptive fields of simple, complex and hypercomplex (end-stopped) cells. These physiological models assume that the end-stopping mechanism is the main trigger of the illusory contour effect.

SUMMARY OF THE INVENTION

According to an aspect of some embodiments of the present invention there is provided a method of processing an image. The method comprises: decomposing the image into a plurality of different resolutions; and for each resolution, processing the image at the resolution to extract edge-orientation information; utilizing the edge-orientation information for identifying contours in the image; and transmitting at least the identified contours to a computer-readable medium.

According to some embodiments of the invention the processing comprises processing the image using at least two adaptation procedures, each featuring a different to curve shifting mechanism, and wherein the edge-orientation information is extracted separately for each adaptation procedure and for each resolution.

According to some embodiments of the invention the at least two adaptation procedures comprises a first adaptation procedure based on image intensity values in the image, and a second adaptation procedure based on intensity values which are respectively complementary to the image intensity values.

According to some embodiments of the invention each adaptation procedure features at least two saturation functions of image intensities.

According to some embodiments of the invention each adaptation procedure comprises, for each picture-element of the image, a weighted subtraction between (i) a saturation function of intensity of the picture-element, and (ii) a saturation function of intensities of picture-elements surrounding the picture-element.

According to some embodiments of the invention each adaptation procedure comprises, for each picture-element of the image, a weighted subtraction between (i) a saturation function of intensities of a central region of picture-elements including the picture-element, and (ii) a saturation function of intensities of picture-elements surrounding the central region of picture-elements.

According to some embodiments of the invention the extraction of the edge-orientation information comprises classifying edges in the image into a set of orientation classes using a set of respective elongated masks.

According to some embodiments of the invention each elongated mask of the set is expressed using a powered cosine or a powered sine of a relative orientation angle.

According to some embodiments of the invention the method comprises, for each orientation class, enhancing contrast of at least one edge within the class relative to image regions neighboring the edge, thereby providing at least one enhanced edge.

According to some embodiments of the invention the enhancement comprises calculating a divisive gain.

According to some embodiments of the invention the method comprises subjecting the edge to a thresholding procedure selected for identifying salient edges in the image.

According to some embodiments of the invention the method comprises to employing a long-range connection detection procedure.

According to some embodiments of the invention the long-range connection detection procedure comprises convolution of the enhanced edge with an elongated mask.

According to some embodiments of the invention the elongated mask of the long-range connection detection procedure is characterized by a length which is at least two times larger than a length characterizing the extraction of the edge-orientation information.

According to some embodiments of the invention the method comprises employing an adaptation procedure for enhancing salient long-range connections and suppressing non-salient long-range connections.

According to some embodiments of the invention the method comprises detecting spatial interference along contours and suppressing contribution of the contours.

According to some embodiments of the invention the image is an image of the interior of a living body and the edge information is used for identifying body part features in the body.

According to some embodiments of the invention the body part features comprise blood vessels.

According to some embodiments of the invention the body part features comprise abnormal cell lining.

According to some embodiments of the invention the image is an image of the interior of the esophagus and the edge information is used for diagnosing the likelihood of Barrett's disease.

According to some embodiments of the invention the image is a mammogram and the edge information is used for identifying mammography classes.

According to some embodiments of the invention the image is a mammogram and the edge information is used for identifying a spiculated mass.

According to some embodiments of the invention the identification is done automatically.

According to some embodiments of the invention the image is an image of at least a bony tissue and the edge information is used for extracting geometrical data of the bony tissue.

According to some embodiments of the invention the image is an image of the GI tract, and the edge information is used for diagnosing a GI tract disease or pathology.

According to some embodiments of the invention the disease or pathology is selected from the group consisting of esophageal carcinoma, peptic ulcer disease, colorectal carcinoma, an inflammatory bowel disease (e.g., ulcerative colitis and Crohn's disease), constipation, gastroesophageal reflux disease, irritable bowel syndrome According to some embodiments of the invention the diagnosing is done automatically.

According to an aspect of some embodiments of the present invention there is provided a system for processing an image. The method comprises a processor configured for receiving the image, decomposing the image into a plurality of different resolutions, processing the image so as to extract edge-orientation information for each resolution, and utilizing the edge-orientation information for identifying contours in the image.

According to an aspect of some embodiments of the present invention there is provided a computer software product. The computer software product comprises a computer-readable medium in which program instructions are stored, which instructions, when read by a computer, cause the computer to receive an image, to decompose the image into a plurality of different resolutions, to processing the image so as to extract edge-orientation information for each resolution, and to utilize the edge-orientation information for identifying contours in the image.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings and images. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 2A-B are schematic illustrations showing a concept of center, surround and remote regions which can be employed in some embodiments of the present invention;

FIGS. 6A-D show conditions for the perception of illusory contours and characteristics of contour strength, as predicted in simulations performed according to some embodiments of the present invention.

DESCRIPTION OF SPECIFIC EMBODIMENTS OF THE INVENTION

Figure 1:
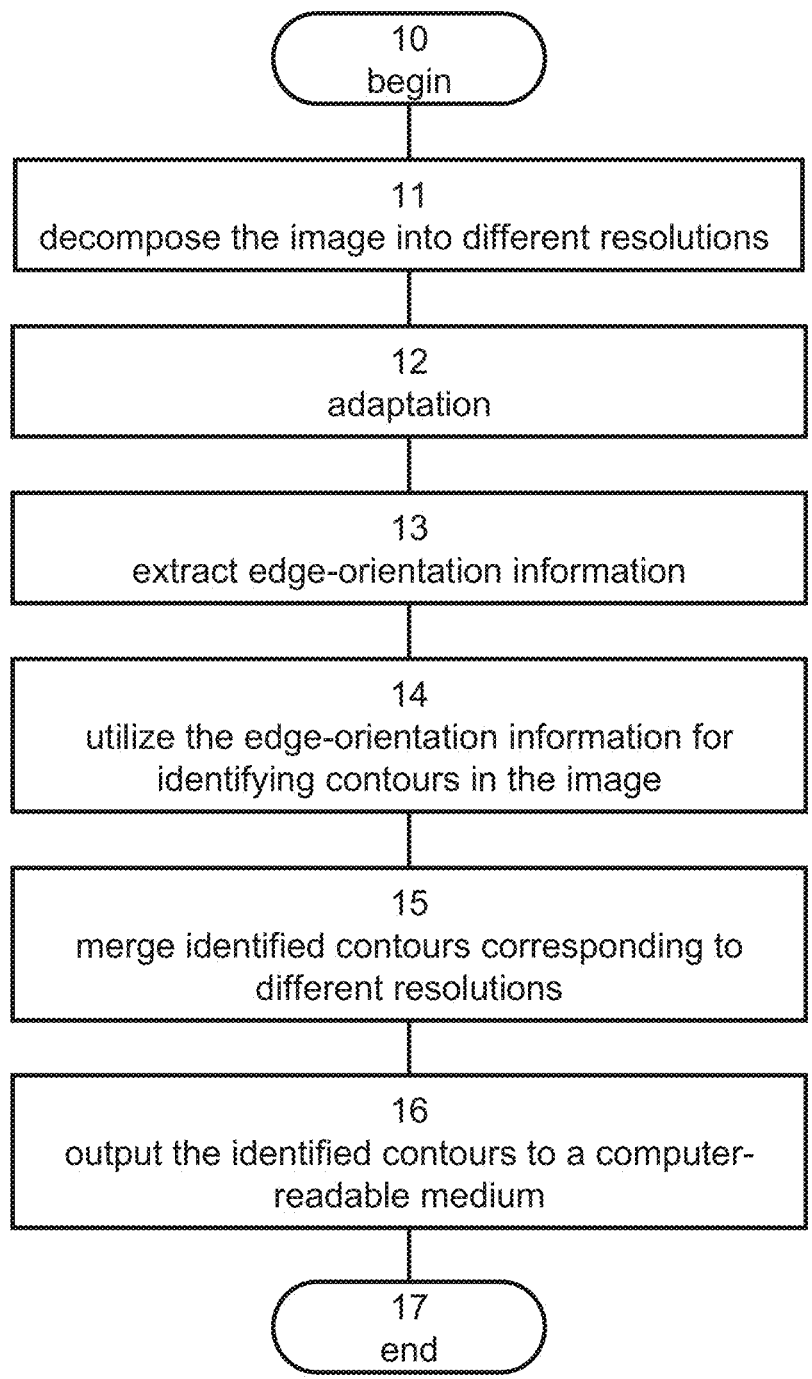
FIG. 1 is a flowchart diagram of a method suitable for processing an image, according to various exemplary embodiments of the present invention.

The present invention, in some embodiments thereof, relates to image processing and, more particularly, but not exclusively, to a method and system for detecting contours in an image.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present embodiments are concerned with method and system for processing an image to facilitate its display or, in some embodiments of the present invention, to allow recognizing in the image features that would not be recognized without the inventive processing. At least part of the processing can be implemented by a data processing system, e.g., a dedicated circuitry or a general purpose computer, configured for receiving the image and executing the operations described below.

The method of the present embodiments can be embodied in many forms. For example, it can be embodied in on a tangible medium such as a computer for performing the method operations. It can be embodied on a computer readable medium, comprising computer readable instructions for carrying out the method operations. In can also be embodied in electronic device having digital computer capabilities arranged to run the computer program on the tangible medium or execute the instruction on a computer readable medium.

Computer programs implementing the method of the present embodiments can commonly be distributed to users on a distribution medium such as, but not limited to, a floppy disk, a CD-ROM, a flash memory device and a portable hard drive. From the distribution medium, the computer programs can be copied to a hard disk or a similar intermediate storage medium. The computer programs can be run by loading the computer instructions either from their distribution medium or their intermediate storage medium into the execution memory of the computer, configuring the computer to act in accordance with the method of this invention. All these operations are well-known to those skilled in the art of computer systems.

The image to be analyzed using the teachings of the present embodiments is generally in the form of imagery data arranged gridwise in a plurality of picture-elements (e.g., pixels, group of pixels, etc.).

The term "pixel" is sometimes abbreviated herein to indicate a picture-element. However, this is not intended to limit the meaning of the term "picture-element" which refers to a unit of the composition of an image.

References to an "image" herein are, inter alia, references to values at picture-elements treated collectively as an array. Thus, the term "image" as used herein also encompasses a mathematical object which does not necessarily correspond to a physical object. The original and processed images certainly do correspond to physical objects which are the scene from which the imaging data are acquired.

Each pixel in the image can be associated with a single digital intensity value, in which case the image is a grayscale image. Alternatively, each pixel is associated with three or more digital intensity values sampling the amount of light at three or more different color channels (e.g., red, green and blue) in which case the image is a color image. Also contemplated are images in which each pixel is associated with a mantissa for each color channels and a common exponent (e.g., the so-called RGBE format). Such images are known as "high dynamic range" images.

In various exemplary embodiments of the invention the image is processed for the purpose of identifying contours in the image. The contours, in some embodiments, are contours referred to as "illusory contours."

As used herein an "illusory contour," is a one-dimensional image object formed of at least two intensity or color contours lacking continuity therebetween.

An intensity contour, as used herein, is a continuous one-dimensional locus of picture-elements having generally the same intensity. A color contour, as used herein, is a continuous one-dimensional locus of picture-elements having generally the same color.

The term illusory contours is used in connection with non-continuous image objects due to the visual percepts of such objects. In the visual system, boundaries are completed and colors and brightness filled in to compensate for the image degradation that is caused, for example, by the retinal veins or blind spots. The observer is typically unable to distinguish which parts of such a completed percept are derived directly from retinal signals and which parts are due to boundary completion. The completed percepts are called "illusory" figures.

The contours identification technique of the present embodiments can be used in the analysis of many types of images, particularly images in which partial information is missing, e.g., due to excessive noise and/or limited capability of the imaging modality. Some embodiments of the present invention can also be used for processing medical images so as to automatically detect and/or diagnose certain anatomical features and/or pathologies. In some embodiments, the technique is employed for classifying and assigning one or more image regions to a distinct class. When the images are medical images, the classes may be selected to represent normal anatomic signatures and also signatures of anatomic anomalies.

For example, in some embodiments of the present invention the image is an image of the interior of a living body and the contours identification technique is used for identifying body part features, such as, but not limited to, blood vessels, normal and abnormal cell lining and the like. In some embodiments of the present invention, the image is a mammogram and the contours identification technique is used for identifying mammography classes, including, without limitation, spiculated mass, fibroglandular tissue, lymph node, and calcification cluster. It is appreciated, however, the names of to the classes and their meanings may vary widely and may in practice be more abstract than these simple examples. In some embodiments of the present invention, the image is an image of the interior of the esophagus and the contour identification is used for automatically detecting and/or diagnoses certain anatomical features and/or pathologies in the esophagus. For example, the contours identification technique of the present embodiments can be used for diagnosing Barrett's disease. The contours identification technique of the present embodiments can also be used for extracting geometrical data of an image of a bony tissue, such as, but not limited to, a spine image, e.g., for the purpose of localizing specific elements of the spine and/or determining spine deformities.

The input image can be provided by any imaging modality, including, without limitation, an ultrasound system (such as, but not limited to, a mammography system), a CT system, a thermal imaging system, an MRI system, a SPECT system, an X-ray system, a Compton-scattering X-ray system, a Doppler imaging system, a spectral Doppler imaging system and the like. The input image can also be provided by an in-vivo imaging device, such as, but not limited to, a swallowable capsule having therein a camera or a video sensor. An in-vivo imaging device can provide images of a body lumen or cavity, including, without limitation, the pharynx, the esophagus, the stomach, the duodenum, the small bowel, and the colon, which are collectively referred to herein as the gastrointestinal (GI) tract. The technique of the present embodiments can be used for completing missing information in GI tract images, and optionally identify a disease or pathology therein, including, without limitation, esophageal carcinoma, peptic ulcer disease, colorectal carcinoma, an inflammatory bowel disease (e.g., ulcerative colitis and Crohn's disease), constipation, gastroesophageal reflux disease, irritable bowel syndrome.

Referring now to the drawings, FIG. 1 is a flowchart diagram of a method suitable for processing an image, according to various exemplary embodiments of the present invention. The method begins at 10 and optionally and preferably continues to 11 at which the image is decomposed into a plurality of different resolutions. This can be done in more than one way. In some embodiments of the present invention a resolution is obtained by downsampling a finer resolution. Thus, denoting the image intensity at the kth resolution by $I^k(x, y)$, where the set of tuples (x, y) represents the picture-elements in the image, the image intensity at resolution k+1 can be written as $I^{k+1}(x, y) = I^k(\rho_{DS}x, \rho_{DS}y)$, where $\rho_{DS}$ is a predetermined downsampling coefficient, and where $I^1(x, y)$ can be, for example, the original image, denoted $I_{in}(x,y)$. In some embodiments, the decomposing can be done by integrating the image $I_{in}(x,y)$ with a kernel function, using a different spatial support for each resolution. A representative example of a kernel function for the kth resolution is a Gaussian kerenel, $$\frac{1}{\sqrt{\pi}\,\rho^k}\exp\left(-\frac{x^2+y^2}{(\rho^k)^2}\right),$$

where ρ is a predetermined parameter.

Optionally and preferably, the decomposing is preceded by a procedure in which a complementary image is defined. This can be done, for example, using the transformation I→L−I, where L is a predetermined parameter. In some embodiments of the present invention L equals the maximal luminance of the image or the maximal luminance within some predetermined working luminance range. Herein, the subscript "off" is used to denote a complementary image is denoted, and a the subscript "on" is used to denote a non-complementary image (e.g., the original image or an image derived from the original image without the complementary transformation).

When a complementary image is defined, the decomposing is performed for both $I_{off}$ and $I_{on}$. Thus, for example, $I_{on}^1(x, y) = I_{in}(x, y)$, $I_{on}^{k+1}(x, y) = I_{on}^k(\rho_{DS}x, \rho_{DS}y)$, $I_{off}^1(x, y) = L - I_{in}(x, y)$, and $I_{off}^{k+1}(x, y) = I_{off}^k(\rho_{DS}x, \rho_{DS}y)$.

The method optionally and preferably continues to 12 at which an adaptation procedure is employed. This can be done using in any technique known in the art. Representative examples include the procedure described in U.S. Published Application No. 20040165086, International Patent Publication Nos. WO2004/075535 and WO2009/081394, the contents of which are hereby incorporated by reference. A preferred companding procedure will now be explained.

The following procedure is inspired by a known physiological phenomenon in the human vision system which is called "induction phenomenon." According to this mechanism, the perceived image is not just a simple function of the stimulus from specific receptor cell, but rather a more complicated combination of other stimuli, originating from other receptors in the field of view.

Hence, a given ganglion cell in the retina receives input both from receptors at the center receptive field area and receptors of nearby, referred to below as surrounding, receptive field area. The human vision mechanism operates in the retinal ganglion cell by subtracting surround responses from center responses. In addition, it is believed that the processing at the retinal ganglion cell level further includes influences of responses from receptors being in a "remote" area of the receptive field that is even farther than the "surround" area from the "center" area. These influences are typically through the amacrine cells and horizontal cells of the retina.

The adaptation procedure of the present embodiments is described below for an arbitrarily chosen picture-element (e.g., a pixel), generally referred to herein as element 40. It is to be understood that various embodiments of the invention are applied independently for most or all the picture-elements of the image.

The companding procedure of the present embodiments preferably defines several regions in the vicinity of picture-element 40 (but not necessarily adjacent thereto) are defined. In various exemplary embodiments of the invention a surrounding region and a remote region are defined for element 40. In some embodiments, a center region comprises element 40 and picture elements immediately adjacent to element 40, is also defined. Alternatively, the center region may be a single element region, hence comprising only element 40. This alternative, of course, coincide with the embodiment in which no center region is selected.

As further detailed hereinafter, the regions, preferably measured in units of picture-elements, are used to simulate the physiological adaptation mechanism of the human visual system.

Figures 2A, 2B:
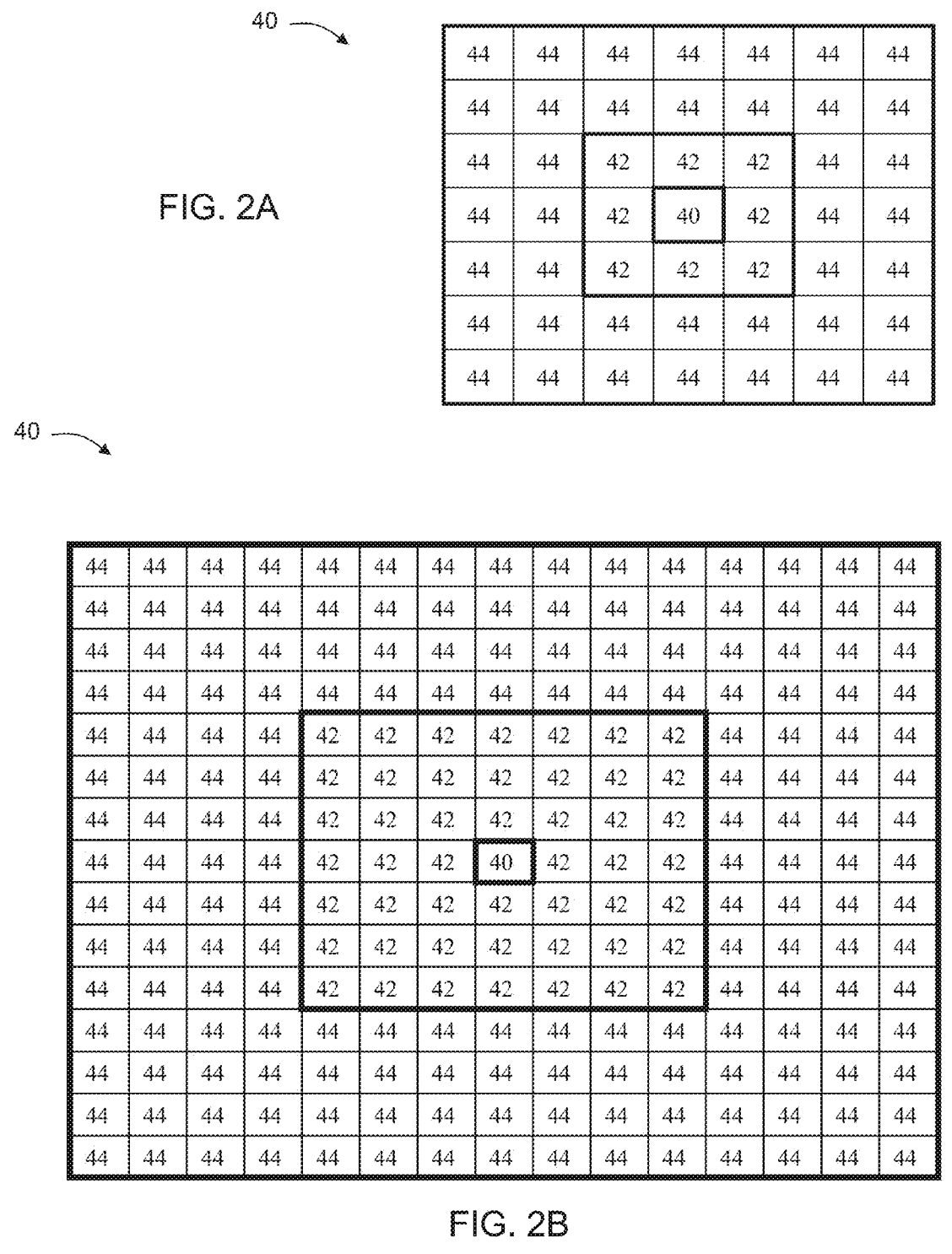

The concept of the center, surrounding and remote regions may be better understood from the following example, with reference to FIGS. 2A-B. Thus, if the picture elements are arranged in a rectangular grid 46, the center region may be a single picture element (element 40), the surround region may be picture elements 42 surrounding picture elements 40 and the remote region may be picture elements 44, surrounding picture elements 42.

In FIG. 2A, the surround region comprises eight picture-elements immediately surrounding (i.e., adjacent to) element 40, and the remote region comprises 40 picture-element forming the two layers surrounding those eight picture-elements. However, this need not necessarily be the case, since, for some applications, it may be desired to extend the surround region farther from those eight elements which immediately surround element 40. FIG. 2B, for example, illustrates an embodiment in which the surround region comprises 48 picture-element which form the first three layers surrounding element 40, and the remote region comprises 176 picture-element which form the four layers surrounding those 48 elements. Also contemplated are embodiments in which the center region comprises more picture-element, e.g., an arrangement of 2×2 or 3×3 picture-elements. Other definitions for the center, surrounding and remote regions are not excluded from the present invention, both for a rectangular grid or for any other arrangement according to which the picture elements of the image are inputted.

Once the surround and optionally the remote and/or center regions are defined, the intensities of the picture elements in each region are preferably used for calculating, for each region, an overall regional intensity. Below, the subscript "c", "s" and "r" are used to denote quantities relating to the center, surround and remote regions, respectively. Mathematical expressions which are applicable to two or more regions are written below using combined subscripts, e.g., c/s/r or c/s or the like.

According to some embodiments of the present invention the overall intensity may be calculated using regional spatial profiles, $f_c$, $f_s$ and $f_r$. Preferably, the overall intensity for a respective region is calculated as an inner product or convolution of the intensity level of the picture elements in that region with the respective regional spatial profile. Mathematically these inner products or convolutions are realized by $I_{c/s/r} = \int I * f_{c/s/r} ds$ where the integration is to be understood as convolution, and where ds is an area integration measure, which is selected in accordance with the arrangement of the inputted picture elements, e.g., for a rectangular x-y grid-like arrangement ds equals dx dy.

The regional spatial profiles used for calculating the overall regional intensities are preferably spatial decaying functions, with may have different forms, depending on the region in which the profiles are applied. Examples for the specific form of each regional spatial profile include, but are not limited to, a Gaussian, an exponent, a Lorenzian, a modified Bessel function and a power-decaying function.

The integrations in the above expressions for $I_c$, $I_s$ and $I_r$ spans over the respective region. Typically, but not necessarily, for the overall center intensity the integration spans over a single picture element (element 40). For example, when a picture-element is a pixel, $I_c$ can equal the intensity level associated with this pixel. For the overall surround intensity, the integration can extend over a radius of 3 picture-elements, not including element 40, and for the overall remote intensity the integration area can extend over an annulus having an inner radius of 3 picture-elements and an outer radius of 7 picture-elements (see, e.g., FIG. 2B). At the boundaries of the images, all the integrations preferably facilitate periodic boundary conditions.

In various exemplary embodiments of the invention one or more adaptation terms are calculated using intensity levels of each picture element of the surrounding and remote regions. These adaptation terms are denoted herein as $\sigma_c$ and $\sigma_s$ corresponding, respectively, to the center and surround regions. In some embodiments, each of the adaptation terms comprises a local part and a remote part, to account for the influence of the remote region. Specifically, $\sigma_c = \sigma_{c,\,local} + \sigma_{c,\,remote}$, and $\sigma_s = \sigma_{s,\,local} + \sigma_{s,\,remote}$. $\sigma_{c,\,local}$ is preferably a function of the overall center intensity, $I_c$, and $\sigma_{c,\,remote}$ is preferably a function of overall remote intensity $I_r$. Similarly, $\sigma_{s,\,local}$ is preferably a function of the overall surround intensity $I_s$, and $\sigma_{s,\,remote}$ is preferably a function of overall remote intensity $I_r$. The local parts and the remote parts of the center and surround adaptation terms determine the relative weight of the remote region on each adaptation term.

The local parts of $\sigma_c$ and $\sigma_s$ are optionally and preferably calculated as linear functions of the regional overall intensities (with either constant or variable coefficients). This can be written as $\sigma_{c/s,\,local} = \alpha_{c/s} I_r + \beta_{c/s}$. The value of the coefficients $\alpha_{c/s}$ and $\beta_{c/s}$ may be selected in accordance with the dynamic range of the image. The two coefficients $\beta_{c/s}$ generally control the amount of adaptation which is performed by the adaptation terms. More specifically, $\beta_{c/s}$ function as adaptation thresholds, where for large values of $\beta_{c/s}$, the adaptation level of the respective region is low and for low values of $\beta_{c/s}$, the adaptation level is high. The amount of the required adaptation can also depend on the intensity at a particular picture element or on the intensity of a group of picture elements, e.g., the picture elements populating the remote region or more. Thus, in these embodiments $\beta_{c/s}$ is a function rather than a constant coefficient. According to some of these embodiments, $\beta_{c/s}$ is an increasing function of the intensity, so that for low intensity regions the amount of adaptation is high and for high intensity regions the amount of adaptation is low.

Although the coefficients $\alpha_{c/s}$ and $\beta_{c/s}$ are mathematical coefficients, they are optionally based on electro-physiological findings. In accordance with the above physiological "gain control", each of the center and surround adaptation term independently characterizes a dynamical intensity curve. The coefficients $\alpha_{c/s}$ are thus determine the degree of curve-shifting, for example, higher values of $\alpha_{c/s}$ lead to higher shifting amount of the response curve. The combination between $\alpha_{c/s}$ and $\beta_{c/s}$ determine the onset of the gain-control mechanism, hence $\alpha_{ds}$ and $\beta_{c/s}$ serve as gain thresholds.

Once the adaptation terms $\sigma_{c/s}$ are calculated, the adaptation procedure defines, for each of the center and surround regions an adapted signal using the expression $I/(I+\sigma)$. The adapted signals of the center and surround signals are denoted $C(x,y)$ and $S(x,y)$, respectively. Thus, $C(x,y) = I_c(x,y)/(I_c(x,y) + \sigma_c(x,y))$ and $S(x,y) = I_s(x,y)/(I_s(x,y) + \sigma_s(x,y))$. The values of the adapted signals C and S is, optionally and preferably used for calculating a response signal $R(x,y)$. In various exemplary embodiments of the invention the response signal is calculated as a weighted subtraction between C and S. For example, R can be calculated according to the relation $R(x,y) = \xi_{CS} C(x,y) - S(x,y)$, where $\xi_{CS}$ is a predetermined parameter.

In various exemplary embodiments of the invention the adaptation procedure is applied separately for each resolution and separately for the non-complementary and complementary images. Thus, in these embodiments, the adaptation procedure defines for each region, $2N_{RSL}$ overall regional intensities, where $N_{RSL}$ is the number of resolution. The overall regional intensities $I_{c/s/r,on}^k$ and $I_{c/s/r,off}^k$, where $1 \le k \le N_{RSL}$, are used for defining adaptation terms $\sigma_{c/s,on}^k$ and $\sigma_{c/s,off}^k$, respectively, which in turn are used for defining the adapted signals $C_{on}^k$ and $S_{off}^k$, and the responses $R_{on}^k$ and $R_{off}^k$.

The adaptation procedure applied to the non-complementary and complementary images can employ the same or different sets of parameters, as desired. In some embodiments of the present invention the adaptation procedure applied to the non-complementary image features a first effective saturation function of the intensity, and the adaptation procedure applied to the complementary image features a second effective saturation function of the intensity. The first effective saturation function is typically different from the second effective saturation function.

Figure 3A:
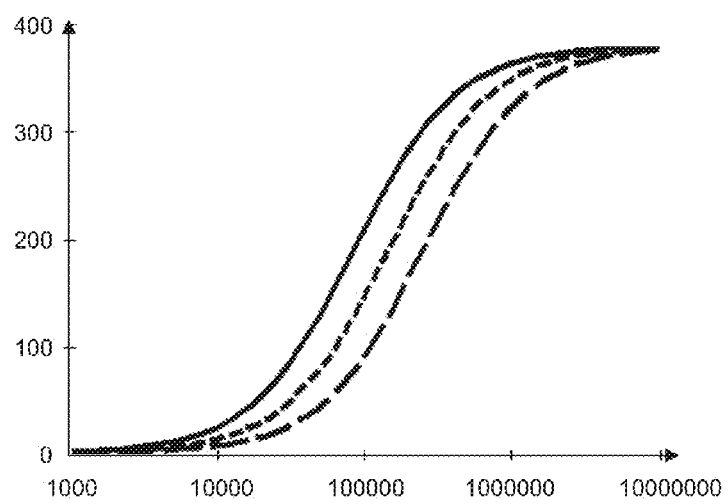
FIGS. 3A-B are schematic illustrations of two different effective saturation to functions which can be employed in some embodiments of the present invention.
Figure 3B:
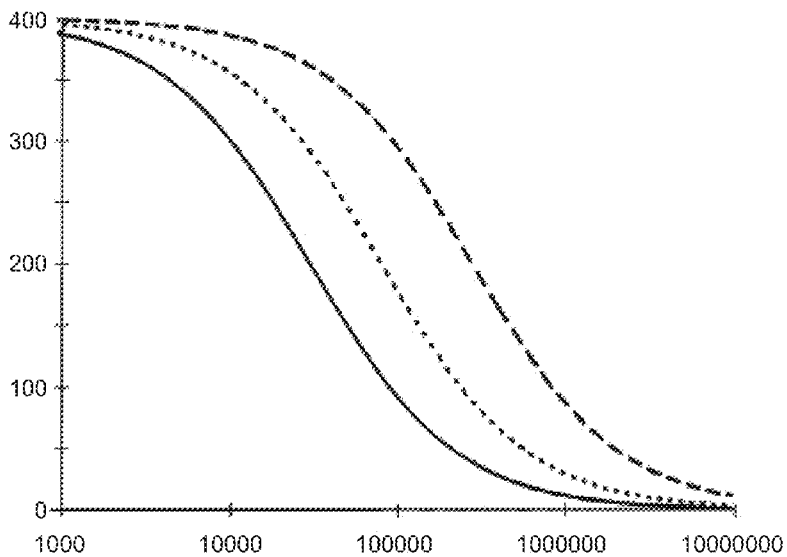

Representative examples of such functions are shown in FIGS. 3A-B, each depicting three "response curves", on a logarithmic scale. The curves are "response curves" in the sense that the abscissas represent the input intensity levels and the ordinates represent the intermediate intensity levels. Thus, the curves illustrate the manner by which the adaptation procedures of the present embodiments response to the input data. It is to be understood that the scales, values and/or number of response curves shown in FIGS. 3A-B serve as representative examples and are not to be considered as limiting.

The solid lines in FIGS. 3A-B correspond to a low input level (e.g., dark picture-element in the original physical image), the dashed lines correspond to high input level (bright picture-element in the original physical image) and the dotted lines correspond to medium input level (fainter picture-element in the original physical image). In both FIGS. 3A and 3B, the response curve for bright input is lower than the response curve of dark or faint input. Thus, each of FIGS. 3A-B represents a monotonic function of the intensity. Yet, the response, e.g., to bright input is higher in FIG. 3A than in FIG. 3B. It was found by the present inventors that such selection of the adaptation procedures mimics the operation of the physiological visual system. Specifically, the first and second adaptation procedures respectively mimic the "on" and "off" retinal pathways because the adaptation of "on-center" and "off-center" cell types is performed through different types of dynamical curve shifting.

Referring again to FIG. 1, the method optionally and preferably continues to 13 at which for each resolution, the image is processed at the respective resolution to extract edge-orientation information. The orientation extraction is preferably employed separately for the non-complementary and complementary images. The edge-orientation information can be extracted by classifying edges in the image into a set of orientation classes using a set of respective elongated masks. Thus, a set of orientations and a corresponding set of elongated masks are selected. In various exemplary embodiments of the invention the responses $R_{on/off}^k$ are convolved, separately, with each elongated spatial mask of the set. Each orientation is associated with an angle $\Omega_l$ which can be expressed as $$\Omega_l = \frac{\pi \cdot l}{N_\Omega},$$

where $N_\Omega$ is a predetermined parameter representing the number of the orientations in the set, and $l$ is an orientation index ($1 \le l \le N_\Omega$). The result of this convolution is referred to herein as an orientation-dependent signal and denoted $E_{on/off}^k(x,y,l)$. $E_{on/off}^k(x,y,l)$ thus represents an edge at location $(x,y)$ and orientation $\Omega_l$.

Each elongated mask of the set is optionally and preferably expressed using a powered cosine or a powered sine of a relative orientation angle. Representative examples of elongated spatial masks $f_{bar}(x,y,l)$ suitable for the present embodiments include a step-like mask, such as, but not limited to:

$$f_{bar}(x,y,l) = \begin{cases} N_1(v_{bar}, L_{bar}) \cdot \cos^{2v_{bar}}[\Omega_l - \theta(x,y)] & x^2 + y^2 < L_{bar}^2 \\ 0 & \text{elsewhere} \end{cases}$$

where $$\theta(x,y) = \arctan\left(\frac{y}{x}\right)$$

is the polar angle, $v_{bar}$ is an integer representing the orientation selectivity of the simple cell, $L_{bar}$ is a length parameter and $N_1(v_{bar}, L_{bar})$ is a normalization factor.

The method continues to 14 at which the edge-orientation information is utilized for identifying contours in the image. A detailed description of a procedure suitable for identifying contours in the image based on the ordination-dependent edges $E_{on/off}^k(x,y,l)$, will now be provided.

In various exemplary embodiments of the invention the contrast of one or more edges within each orientation class is enhanced relative to image regions neighboring the edge. This can be done, for example, using a divisive gain. Preferably, the gain is calculated as the ratio $(\epsilon + |E_{on/off}^k(x,y,l)|)/(\epsilon + E_{r,on/off}^k(x,y,l))$, where $\epsilon$ is a predetermined parameter and $E_{r,on/off}^k(x,y,l)$ is a remote orientation-dependent signal which is preferably calculated as a weighted convolution of the orientation-dependent signal $E_{on/off}^k(x,y,l)$ with the remote spatial profile $f_r$. The $\epsilon$ parameter is preferably much smaller (e.g., at least 100 times smaller) than the amplitude of the simple cell responses within the luminance working range.

A more detailed description of a preferred procedure for calculating a divisive gain is provided in the Examples section that follows. Once the divisive gain is calculated, an enhanced edge $E_{on/off}^{k,enh}(x,y,l)$ is calculated as a multiplication of $E_{on/off}^k(x,y,l)$ by the divisive gain.

In some embodiments of the present invention the enhanced edge $E_{on/off}^{k,enh}(x,y,l)$ is subjected to a thresholding procedure selected for identifying salient edges in the image. A more detailed description of a preferred thresholding procedure for identifying salient edges is provided in the Examples section that follows. An edge that passes the thresholding procedure is denoted below by the symbol $\hat{E}_{on/off}^k(x,y,l)$.

In some embodiments of the present invention a long-range connection detection procedure is employed. The purpose of this procedure is for detecting candidate connections between separated contour segments. The long-range connection detection procedure preferably comprises convolution of edge information with an elongated mask, separately for each orientation class. The result of the convolution is referred to below as an edge connection and denoted $L_{on/off}^k(x,y,l)$.

Thus, in these embodiments long-range connection detection procedure features a set of elongated masks. The elongated masks can be similar to the masks defined above with respect to the extraction of edge-orientation information, albeit not-necessarily using the same parameters. The present inventors found, however, that the use of spatially decaying masks instead of the step-like mask defined above. A representative example of a spatially decaying mask suitable for the present embodiments include, without limitation, $$f_{con}(x,y,l) = N_2(v_{con}, L_{con}) \cdot \cos^{2v_{con}}[\Omega_l - \theta(x,y)] \cdot \exp\{-(x^2+y^2)/L_{con}^2\}$$

$v_{con}$ is an integer representing the orientation selectivity of the connection, $L_{con}$ is a length parameter and $N_2(v_{con}, L_{con})$ is a normalization factor. In various exemplary embodiments of the invention the edge-connections $L_{on/off}^k(x, y, l)$ are obtained by convolving $\hat{E}_{on/off}^k(x, y, l)$ with $f_{con}^k(x, y, l)$.

In some embodiments of the invention, the contrast of one or more edge connections within each orientation class is enhanced relative to image regions neighboring the edge. It was found by the present inventors that such operation enhances the collinearity of illusory contours, and suppress non-relatable contours, including contours that are parallel to stronger contours.

The enhancement can be done, for example, using a divisive gain. Preferably, the gain is calculated as the ratio $(\epsilon + |L_{on/off}^k(x, y, l)|)/(\epsilon + L_{r,\,on/off}^k(x, y, l))$, where $\epsilon$ is a predetermined parameter and $L_{r,\,on/off}^k(x, y, l)$ is a remote connection signal which is preferably calculated as a weighted convolution of the edge connection $L_{on/off}^k(x, y, l)$ with the remote spatial profile $f_r$. A more detailed description of a preferred procedure for calculating a divisive gain for enhancing edge connections is provided in the Examples section that follows. Once the divisive gain is calculated, an enhanced edge connection $L_{on/off}^{k,enh}(x, y, l)$ is calculated as a multiplication of $L_{on/off}^k(x, y, l)$ by the divisive gain.

The enhanced edge connections $L_{on/off}^{k,enh}(x, y, l)$ can then be used for identifying contours in the image. In some embodiments of the present invention enhanced edge connections are subjected to a thresholding procedure selected for identifying salient edge connections in the image. Preferably, the thresholding procedure is applied separately for each resolution k and orientation class l to a combination, e.g., a sum or a weighted sum of $L_{off}^{k,enh}(x, y, l)$ and $L_{on}^{k,enh}(x, y, l)$. A more detailed description of a preferred thresholding procedure for identifying salient edge connections is provided in the Examples section that follows. An edge connection that passes the thresholding procedure is denoted below by the symbol $\hat{L}^k(x, y, l)$. Note that in these embodiments $\hat{L}^k(x, y, l)$ does not carry an "on" or "off" subscript. This is because in these embodiments it is sufficient to select either the contour as calculated from the non-complementary image or the contour as calculated from the complementary image. In some embodiments of the present invention $\hat{L}^k(x, y, l)$ equals $\max\{L_{on}^{k,enh}(x, y, l), L_{off}^{k,enh}(x, y, l)\}$, provided $L_{off}^{k,enh}(x, y, l)$ and $L_{off}^{k,enh}(x, y, l)$ have passed the thresholding procedure.

Once the set $\hat{L}^k(x, y, l)$ is calculated, it is optionally and preferably used for identifying contours in the image can be identified by summing $\hat{L}^k(x, y, l)$ over all orientation classes, for each resolution k. In some embodiments of the present invention the summation of $\hat{L}^k(x, y, l)$ is preceded by calculation of a gain factor $G_{on/off}^{k,inh}(x, y, l)$ selected for reducing or inhibiting illusory contours intersected by spatial interference. In these embodiments, the contours in the image are preferably identified by summing the multiplication $G_{on/off}^{k,inh}(x, y, l) \hat{L}^k(x, y, l)$ over all orientation classes, for each resolution k. The contours identified by summing over the edge connections $\hat{L}^k$ (with or without multiplying by the gain factor G) are referred to below as completed contours and denoted $Icon_{on/off}^k(x, y)$.

The calculation of a gain factor $G_{on/off}^{k,inh}(x, y, l)$ according to some embodiments of the present invention comprises calculation of a set of edges $L_{inh}^k(x, y, l)$ which are indicative of the existence of spatial interference along a presumed contour. $L_{inh}^k(x, y, l)$ are optionally and preferably calculated by convolving a local cross orientation signal or some function thereof with $f_{con}(x, y, l)$, where the local cross orientation signal of a given orientation class l, is a weighted sum over all orientation classes of edges that interfere with the extension of an edge of class l. The gain factor G can then be calculated by applying a threshold, based on $L_{inh}^k(x, y, l)$. A more detailed description of a representative example of a procedure suitable for calculating the gain factor G is provided in the Examples section that follows.

The method preferably proceeds to 15 at which identified contours corresponding to different resolutions are merged. The merging is preferably performed recursively, from the coarsest to the finest resolution. For example, an image at the coarsest resolution $k = N_{RSL}$, can be defined as $C_{on/off}^{N_{RSL}}(x, y)$. This image can be interpolated to a finer resolution $k-1$, by oversampling by factor $\rho_{DS}$. Preferably, the oversampling is accompanied by convolution with the surround spatial profile $f_s$. The advantage of combining the oversampling with convolution is that the profile serves as a low-pass filter, which suppresses interpolation artifacts. The result of the oversampling and optional convolution is referred to as a reconstructed surround signal at resolution $k-1$. This reconstructed surround signal is preferably combined (e.g., summed, optionally with appropriate weights) with the response signal $R_{on/off}^{k-1}(x, y)$ and the completed contour $Icon_{on/off}^{k-1}(x, y)$. The result of the combination defines a reconstructed image at resolution $k-1$.

The procedure is preferably repeated iteratively wherein at each iteration, the result of the previous iteration is oversampled, optionally convolved with $f_s$, and combined with the response signal and the completed contour. Once the iteration is completed to the finest resolution, an output image $I_{rec}$ can be reconstructed using the expression $$I_{rec}(x, y) = \frac{L_{max}}{2} + \frac{g_{rec}}{2} \cdot [I_{on}^{1,rec}(x, y) - I_{off}^{1,rec}(x, y)],$$

where $I_{on}^1(x, y)$ and $I_{off}^1(x, y)$ are the "on" and "off" reconstructed images at the finest resolution, $L_{max}$ is the same parameter used to define the complementary image and $g_{rec}$ is a predetermined stretching parameter. In some embodiments of the present invention the stretching parameter is reciprocal to the value of the local adaptation curve at the maximal local luminance value $(L_{max}/[(1+\alpha_c)\cdot L_{max}+\beta_c])$.

The method continues to 16 at which at least the identified contours are transmitted to a computer readable medium, such as a display device, a printer, or a memory storage medium.

The method ends at 17.

At least some operations of the method can be used independently of other operations, as the case may be. For example, a procedure for calculating edges indicative of the existence of spatial interference can be used for identifying image features, such as spiculated masses in a mammogram or the like.

As used herein the term "about" refers to ±10%.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

Examples

Reference is now made to the following examples, which together with the above descriptions illustrate some embodiments of the invention in a non limiting fashion.

Embodiments of the present invention have been utilized for identifying and displaying illusory contours in images.

Methods

Figure 4:
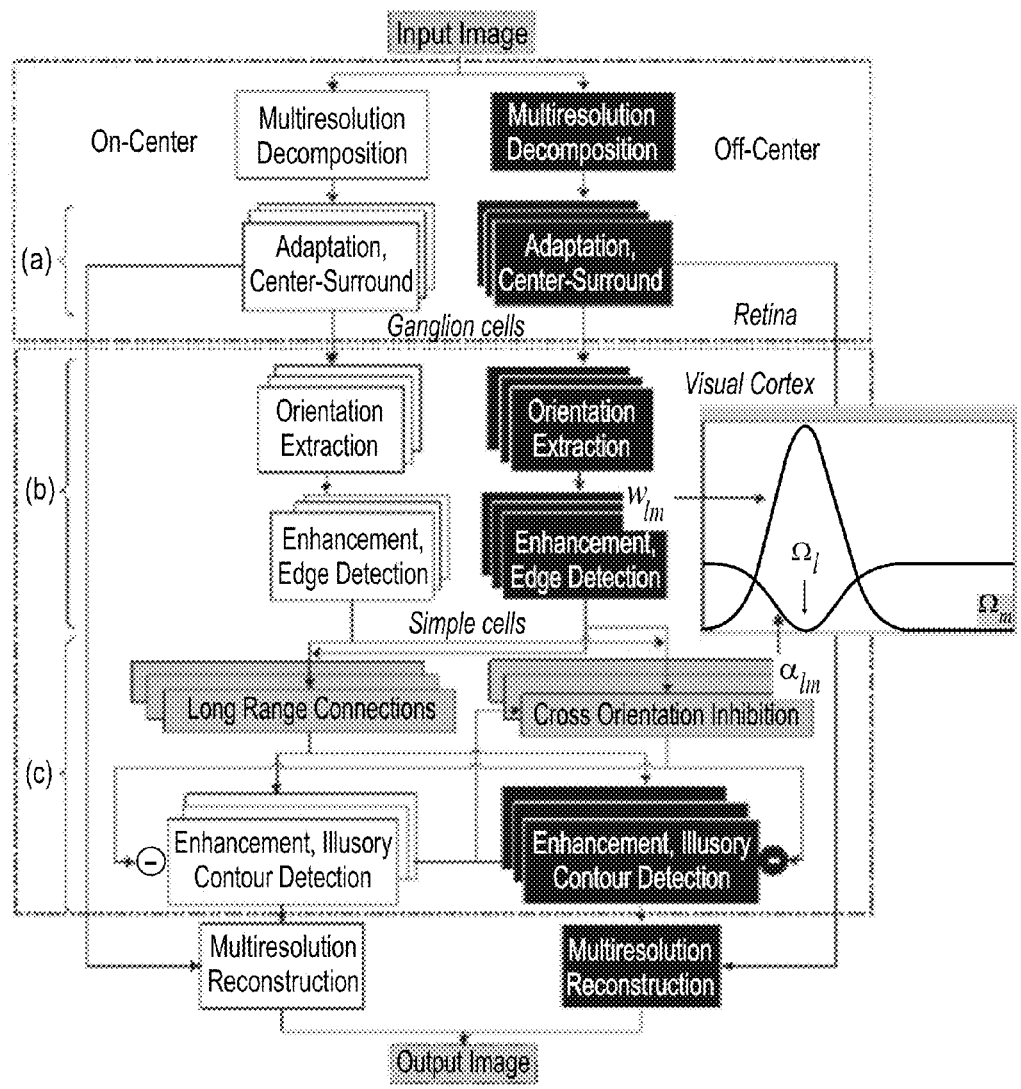
FIG. 4 is a flowchart diagram showing a method used in simulations performed according to some embodiments of the present invention for identifying illusory contours.

The procedure is schematically illustrated in FIG. 4. The input image $I_{in}(x, y)$ was decomposed into an "on" and "off" channels. At the finest resolution, the on and the off channels $I_{on}^1(x, y)$ and $I_{off}^1(x, y)$, were calculated as follows:

$$I_{on}^1(x,y) = I_{in}(x,y) \tag{1}$$

$$I_{off}^1(x,y) = L_{max} - I_{in}(x,y) \tag{2}$$

where $L_{max}$ is the maximal luminance within the working range.

The Center and Surround signals of resolution k, $I_{c,on/off}^k(x, y)$ and $I_{s,on/off}^k(x, y)$, respectively, were extracted from the input image of resolution k by convolving it with the corresponding spatial masks $f_c(x, y)$ and $f_s(x, y)$.

$$I_{c,on/off}^k(x, y) = \int\int_{visual\ field} I_{on/off}^k(x-x', y-y') \cdot f_c(x', y')\, dx'\, dy' \tag{3}$$

$$I_{s,on/off}^k(x, y) = \int\int_{visual\ field} I_{on/off}^k(x-x', y-y') \cdot f_s(x', y')\, dx'\, dy' \tag{4}$$

The spatial masks were circularly-symmetric Gaussian decaying spatial weight functions with the diameter of the Surround, $\rho_{sur}$, being larger than that of the Center, $\rho_{cen}$ by a factor of about 3.

$$f_c(x,y) = (\pi \rho_{cen}^2)^{-1} \cdot \exp\{-(x^2+y^2)/\rho_{cen}^2\} \tag{5}$$

$$f_s(x,y) = (\pi \rho_{sur}^2)^{-1} \cdot \exp\{-(x^2+y^2)/\rho_{sur}^2\} \tag{6}$$

The image of coarser spatial resolution $I_{on/off}^{k+1}(x, y)$ was obtained by downsampling the Surround signal of resolution k, $I_{s,on/off}^k(x, y)$ by factor $\rho_{DS}$.

$$I_{on/off}^{k+1}(x,y) = I_{s,on/off}^k(\rho_{DS} \cdot x, \rho_{DS} \cdot y), 1 \le k < N_{RSL} \tag{7}$$

In order to attenuate possible aliasing artifacts 0, sur and pips were selected such that that $\rho_{sur} > \rho_{DS}$.

The adaptation procedure was also based on a Remote signal, $I_{r,on/off}^k(x, y)$, weighted over an annular sub-region adjacent to Surround, extending far beyond the borders of the receptive field. The Remote signal was weighted according to the spatial mask $f_r(x, y)$.

$$I_{r,on/off}^k(x, y) = \int\int_{visual\ field} I_{on/off}^k(x-x', y-y') \cdot f_r(x', y')\, dx'\, dy' \tag{8}$$

where $$f_r(x, y) = \begin{cases} (\pi \rho_{rem}^2)^{-1} \cdot \exp\{-(x^2 + y^2 - \rho_{sur}^2)/\rho_{rem}^2\} & x^2 + y^2 > \rho_{sur}^2 \\ 0 & \text{elsewhere} \end{cases} \tag{9}$$

The corresponding adapted signals, $C_{on/off}^k(x, y)$ and $S_{on/off}^k(x, y)$, were computed using the following relations:

$$C_{on/off}^k(x, y) = \frac{I_{c,on/off}^k(x, y)}{I_{c,on/off}^k(x, y) + \sigma_{c,on/off}^k(x, y)} \tag{10}$$

$$S_{on/off}^k(x, y) = \frac{I_{s,on/off}^k(x, y)}{I_{s,on/off}^k(x, y) + \sigma_{s,on/off}^k(x, y)} \tag{11}$$

$\sigma_{c,on/off}^k(x, y)$ and $\sigma_{s,on/off}^k(x, y)$ were calculated as follows:

$$\sigma_{c/s,on/off}^k(x,y) = \sigma_{c/s,on/off,local}^k(x,y) + \sigma_{c/s,on/off,remote}^k(x,y) \quad (12)$$

$$\sigma_{c/s,on/off,local}^k(x,y) = \alpha_{c/s} \cdot I_{c/s,on/off}^k(x,y) + \beta_{c/s} \quad (13)$$

$$\sigma_{c,on/off,remote}^k(x,y) = c_c \cdot I_{r,on/off}^k(x,y) \quad (14)$$

$$\sigma_{s,on/off,remote}^k(x,y) = c_s \cdot I_{r,off/on}^k(x,y) \quad (15)$$

The adapted signals were used for calculating a response $\text{Rcon}_{on/off}^k(x, y)$ as a weighted difference. This response represents contours in the image.

$$\text{Rcon}_{on/off}^k(x,y) = \xi_{CS} \cdot C_{on/off}^k(x,y) - S_{on/off}^k \quad (16)$$

The orientation-dependent signals $E_{on/off}^k(x, y, l)$ were tuned to a specific set of $N_\Omega$ orientations $$\Omega_l = \frac{\pi \cdot l}{N_\Omega}, 1 \le l \le N_\Omega.$$

These signals were computed as follows:

$$E_{on/off}^k(x, y, l) = \int_{\substack{visual \\ field}} \int \text{Rcon}_{on/off}^k(x - x', y - y') \cdot f_{bar}(x', y', l) dx' dy' \quad (17)$$

where $$f_{bar}(x, y, l) = \begin{cases} N_1(v_{bar}, L_{bar}) \cdot \cos^{2v_{bar}}[\Omega_l - \theta(x, y)] & x^2 + y^2 < L_{bar}^2 \\ 0 & \text{elsewhere} \end{cases} \quad (18)$$

$$\theta(x, y) = \arctan\left(\frac{y}{x}\right)$$

is the polar angle, $v_{bar} \in N$ is an integer representing the orientation selectivity of the simple cell, $L_{bar}$ is the length of its bar-shaped receptive field and $N_1(v_{bar}, L_{bar})$ is a normalization factor.

The decay of $f_{bar}$ as a function of the polar angle indicates its orientation selectivity. Since $f_{bar}$ has reflection symmetry across both the parallel and the perpendicular directions to the preferred orientation, it is invariant to the reflections of the stimulus across both of these directions.

The response to neighboring edges was expressed by a remote edge signal $E_{on/off}^k(x, y, l)$ of each orientation class l:

$$E_{r,on/off}^k(x, y, l) = \int_{\substack{visual \\ field}} \int f_r(x', y') \cdot \sum_{m=1}^{N_\Omega} w_{lm} \cdot |E_{on/off}^k(x - x', y - y', m)| dx' dy' \quad (19)$$

where $$w_{lm} = \frac{\cos^{2v_{short}}(\Omega_m - \Omega_l)}{\sum_{m=1}^{N_\Omega} \cos^{2v_{short}}(\Omega_m)} \quad (20)$$

$v_{short} \in N$ is an integer representing the orientation selectivity of the short range weight coefficient $w_{lm}$ (that reflects the similarity of the orientations $\Omega_l$ and $\Omega_m$).

The enhancement was expressed as a divisive gain, which was applied to each orientation separately:

$$E_{on/off}^{k,enh}(x, y, l) = E_{on/off}^k(x, y, l) \cdot \frac{\varepsilon + |E_{on/off}^k(x, y, l)|}{\varepsilon + E_{r,on/off}^k(x, y, l)} \quad (21)$$

where $\epsilon$ is a small positive constant.

The enhancement [Eq. (21)] amplified the difference between the orientations of to the relevant edge (in the Center region) and its periphery in the Remote region.

Among the enhanced edges, $E_{on/off}^{k,enh}(x, y, l)$, the most salient edges, $\hat{E}_{on/off}^k(x, y, l)$ were then selected by applying a threshold:

$$\hat{E}_{on/off}^k(x, y, l) = \quad (22)$$

$$\begin{cases} E_{on/off}^{k,enh}(x, y, l) & E_{on/off}^{k,enh}(x, y, l) > E_{on/off}^{k,min} \cdot (1 - \tau_{or}) + E_{on/off}^{k,max} \cdot \tau_{or} \\ 0 & \text{elsewhere} \end{cases}$$

where $$E_{on/off}^{k,min} = \min_{x,y,l} E_{on/off}^{k,enh}(x, y, l); E_{on/off}^{k,max} = \max_{x,y,l} E_{on/off}^{k,enh}(x, y, l) \quad (23)$$

and $0 < \tau_{or} < 1$ is a dimensionless oriented edge threshold.

Long-range connections $L_{on/off}^k(x, y, l)$, were computed by convolving the most salient oriented edges $\hat{E}_{on/off}^k(x, y, l)$ with elongated spatial mask $f_{con}(x, y, l)$.

$$L_{on/off}^k(x, y, l) = \quad (24)$$

$$\int_{\substack{visual \\ field}} \int \hat{E}_{on/off}^k(x - x', y - y', l) \cdot f_{con}(x', y', l) dx' dy'$$

$f_{con}(x, y, l)$ was selected as a decaying function in the longitudinal dimension, and represented the spatial extent of the long-range horizontal connection of orientation class l:

$$f_{con}(x,y,l) = N_2(v_{con}, L_{con}) \cdot \cos^{2v_{con}}[\Omega_l - \theta(x,y)] \cdot \exp\{-(x^2+y^2)/L_{con}^2\} \quad (25)$$

where $v_{con} \in N$ is an integer representing the orientation selectivity of the connection, $L_{con}$ is a length parameter and $N_2(v_{con}, L_{con})$ is a normalization factor.

A cross orientation inhibition procedure was applied so as to reduce spatial interference between contours. The direct input to the cross orientation inhibition was from the most salient cross-oriented edges $\hat{E}_{on/off}^k(x, y, l)$. In addition, two feedback inputs from the illusory contour completion mechanism were obtained: (a) the enhanced illusory contours $L_{on/off}^{k,enh}(x, y, l)$, and (b) the indicator of the most salient contours $\hat{M}^k(x, y, l)$. The output of the cross orientation inhibition mechanism was a nonlinear gain (threshold) $G_{on/off}^{k,inh}(x, y, l)$ that modulated the contour strength as a function of the to existence of spatial interference along the contour.

At the first stage, the local cross orientation signal $\hat{E}_{on/off}^{XO,k}(x, y, l)$ was computed by summing salient edges $\hat{E}_{on/off}^k(x, y, m)$ of orientations $\Omega_m$ that interfere with the extension of a collinear contour (of orientation $\Omega_l$).

$$\hat{E}_{on/off}^{XO,k}(x, y, l) = \left[ \sum_{m=1}^{N_\Omega} \alpha_{lm} \cdot \hat{E}_{on/off}^{k}(x, y, m) - \hat{E}_{on/off}^{k}(x, y, l) \right]_+ \quad (26)$$

where the subscripted plus sign on the bracket indicates half-wave rectification, and $\alpha_{lm}$ is a weight coefficient that reflects the dissimilarity of the orientations $\Omega_l$ and $\Omega_m$ was calculated as follows:

$$\alpha_{lm} = \frac{1 - \cos^{2\nu_{short}}(\Omega_m - \Omega_l)}{N_\Omega - \sum_{m=1}^{N_\Omega} \cos^{2\nu_{short}}(\Omega_m)}. \quad (27)$$

The subtraction of the collinear edges $\hat{E}_{on/off}^{k}(x, y, l)$ from the cross orientation signal and its rectification both prevent the interference among overlapping inducing edges at the same spatial location. An inhibitory signal $L_{inh}^{k}(x,y,l)$ was computed by integrating the local cross orientation signal $\hat{E}_{on/off}^{XO,k}(x, y, l)$ along the contour location (indicated below by $M^k(x, y, l)$):

$$L_{inh}^{k}(x, y, l) = \quad (28)$$
$$\int_{\substack{visual \\ field}} \int [g^{XO,k}(x - x', y - y', l)]^{P_{inh}} \cdot f_{con}(x', y', l) dx' dy'$$

where $P_{inh}$ is an exponential weight of the local cross-orientation signal, and $$g^{XO,k}(x,y,l) = \hat{M}^k(x,y,l) \cdot [\hat{E}_{on}^{XO,k}(x,y,l) + \hat{E}_{off}^{XO,k}(x,y,l)] \quad (29)$$

$L_{inh}^{k}(x, y, l)$ is indicative of the existence of spatial interference along the presumed illusory contour.

An output gain $G_{on/off}^{k,inh}(x, y, l)$ was computed by applying a threshold, based on the inhibitory cross orientation signal $L_{inh}^{k}(x, y, l)$, to the enhanced illusory contours $L_{on/off}^{k,enh}(x, y, l)$:

$$G_{on/off}^{k,inh}(x, y, l) = \begin{cases} 1 & L_{on/off}^{k,enh}(x, y, l) > a_{inh} \cdot [L_{inh}^{k}(x, y, l)]^{1/P_{inh}} \\ 0 & \text{elsewhere} \end{cases} \quad (30)$$

where $\alpha_{inh}$ is the relative inhibitory threshold.

$P_{inh}$ was introduced into the above definitions so as to increase the weight of the local cross-orientation signal as compared to that of the long-range spatial mask $f_{con}(x, y, l)$. It was found by the present inventors that this reduced the sensitivity of the inhibition strength to the local weight of the spatial interference, which decays with distance.

A remote connection signal $L_{r,on/off}^{k}(x, y, l)$ was calculated by collecting signals from all the weighted orientations, such that similar orientations obtain higher weight values:

$$L_{r,on/off}^{k}(x, y, l) = \quad (31)$$
$$\int_{\substack{visual \\ field}} \int f_r(x', y') \cdot \sum_{m=1}^{N_\Omega} W_{lm} \cdot |L_{on/off}^{k}(x - x', y - y', m)| dx' dy'$$

where $$W_{lm} = \frac{\cos^{2\nu_{long}}(\Omega_m - \Omega_l)}{\sum_{m=1}^{N_\Omega} \cos^{2\nu_{long}}(\Omega_m)} \quad (32)$$

are weight coefficients reflecting the similarity of the orientations $\Omega_l$ and $\Omega_m$, and $\nu_{long} \in \mathbb{N}$ is an integer representing the orientation selectivity.

An enhancement was then applied, separately for each orientation class:

$$L_{on/off}^{k,enh}(x, y, l) = L_{on/off}^{k}(x, y, l) \cdot \frac{\varepsilon + |L_{on/off}^{k}(x, y, l)|}{\varepsilon + L_{r,on/off}^{k}(x, y, l)}. \quad (33)$$

The value of the small parameter $\epsilon$ in Eqs. 33 and 22 was the same. It was found by the present inventors that this procedure enhanced the co-linearity of the illusory contours, while suppressing non-relatable contours, including those that are parallel to the stronger candidate contours.

The saliency of the illusory contours was determined by the strength of the long range connection (of either the same or opposite polarity). A modulation factor $M^k(x,y,l)$, $1 \le k < N_{RSL}$, $1 \le l \le N_\Omega$, was defined as a saliency measure of orientation $\Omega_l$.

$$M^k(x,y,l) = L_{on}^{k,enh}(x,y,l) + L_{off}^{k,enh}(x,y,l) \quad (34)$$

An indicator of the salient contours $\hat{M}^k(x, y, l)$ was computed by applying a threshold to $M^k(x, y, l)$ at each resolution:

$$\hat{M}^k(x, y, l) = \begin{cases} 1 & M^k(x, y, l) > M_{min}^k \cdot (1 - \tau_{ill}) + M_{max}^k \cdot \tau_{ill} \\ 0 & \text{elsewhere} \end{cases} \quad (35)$$

where $$M_{min}^k = \min_{x,y,l} M^k(x, y, l); \quad M_{max}^k = \max_{x,y,l} M^k(x, y, l) \quad (36)$$

and $0 < \tau_{ill} < 1$ is a dimensionless illusory contour threshold.

The dominant long range connection $\hat{L}^k(x, y, l)$ was then defined as:

$$\hat{L}^k(x, y, l) = \begin{cases} \max[L_{on}^{k,enh}(x, y, l), L_{off}^{k,enh}(x, y, l)] & \hat{M}^k(x, y, l) = 1 \\ 0 & \text{elsewhere} \end{cases} \quad (37)$$

$\hat{L}^k(x, y, l)$ was used for defining illusory contours $Icon_{on/off}^{k}(x, y)$ as follows. $\hat{L}^k(x, y, l)$ was modulated by $G_{on/off}^{k,inh}(x, y, l)$ and thereafter summed over all orientations classes:

$$Icon_{on/off}^{k}(x, y) = \sum_{i=1}^{N_\Omega} Icon_{on/off}^{k,l}(x, y), \quad (38)$$

where $$Icon_{on/off}^{k,l}(x, y) = \quad (39)$$
$$\begin{cases} L_{on/off}^{k,enh}(x, y, l) \cdot G_{on/off}^{k,inh}(x, y, l) & L_{on/off}^{k,enh}(x, y, l) = \hat{L}^k(x, y, l) \\ 0 & \text{elsewhere} \end{cases}$$

A reconstruction procedure was used so as to obtain an image that visually demonstrated the luminance values at each location of the input image as they would have been perceived by the visual system. The resolutions were merged recursively, from the coarsest resolution towards the finest one.

The process started with the initialization of the reconstructed image series, $I_{on/off}^{k,rec}(x, y)$, $k=N_{RSL}, (N_{RSL}-1), \ldots 1$, to the predicted Center brightness, at the coarsest resolution (see Eq. (10)):

$$I_{on/off}^{N_{RSL},rec}(x,y) = C_{on/off}^{N_{RSL}}(x,y) \tag{40}$$

The reconstructed image of resolution k+1, $I_{on/off}^{k+1,rec}(x, y)$, was then interpolated to a finer resolution k:

$$S_{on/off}^{k,rec}(x, y) = \int_{\substack{visual \\ field}} \int I_{on/off}^{k+1,rec}\left(\frac{x-x'}{\rho_{DS}}, \frac{y-y'}{\rho_{DS}}\right) \cdot f_s(x', y') dx' dy' \tag{41}$$

The interpolation involved an oversampling by factor $\rho_{DS}$ and an additional convolution with the Surround spatial mask $f_s(x, y)$, which served as a low-pass filter. This filtering suppressed interpolation artifacts.

An interpolated surround signal $S_{on/off}^{k,rec}(x, y)$ reconstructs the Surround signal that has been previously subtracted from the Center signal in order to compute the contour response $Rcon_{on/off}^{k}(x, y)$. A weighted sum was applied to the three signals $S_{on/off}^{k,rec}(x, y)$, $Rcon_{on/off}^{k}(x, y)$, and $Icon_{on/off}^{k}(x, y)$, to define a reconstructed image $I_{on/off}^{k,rec}$:

$$I_{on/off}^{k,rec}(x,y) = \xi_{CS}^{-1} \cdot [Rcon_{on/off}^{k}(x,y) + g_{ill} \cdot Icon_{on/off}^{k}(x,y) + S_{on/off}^{k,rec}(x,y)], \tag{42}$$

where $g_{ill}$ is an illusory contour gain coefficient, which assigns a different weight to the illusory contours relative to the physical contours.

The procedure defined in Eqs. 41 and 42 was recursively repeated $N_{RSL}-1$ times, to provide two finest reconstructed images (k=1), one for each channel: $I_{on}^{1,rec}(x, y)$ and $I_{off}^{1,rec}(x, y)$. These images were combined into a single output image $I_{rec}(x, y)$, as follows:

$$I_{rec}(x, y) = \frac{L_{max}}{2} + \frac{g_{rec}}{2} \cdot [I_{on}^{1,rec}(x, y) - I_{off}^{1,rec}(x, y)] \tag{43}$$

where $g_{rec}$ is a reconstruction gain coefficient, which performs a linear stretching in order to optimally present the reconstructed image on the computer screen.

The spatial masks (Eqs. 5, 6, 9, 18 and 25) were normalized by dividing each coefficient by the total sum of the masks coefficients.

The values for the number of resolutions was and the down-sampling factor were $N_{RSL}=3$, $\rho_{DS}=2$, respectively see Eq. 7) were selected to support a variety of stimulus to scales within a typical 200×200 pixels input image. The luminance working range of the input image was normalized to the range 0-1, and the maximal luminance was selected to be the upper limit of that range ($L_{max}=1$), see Eq. 2.

The diameter of the Center region was determined to be a single pixel, and was determined to be 3 times larger for the Surround region ($\rho_{cen}=0.5$, $\rho_{sur}=1.5$), see Eqs. 5 and 6. The surround diameter (in pixel units) was comparable with the down-sampling factor, and thus the possible aliasing artifacts were sufficiently attenuated.

The diameter of the Remote region was $\rho_{rem}=10$ (see Eq. 9), namely an order of magnitude larger than the Center region.

The values of the center adaptation parameters were $\alpha_c=0.4$, $\beta_c=0.3$, $c_c=0.8$, see Eqs. 13 and 14. The selected values of the surround adaptation parameters were higher than those of the center adaptation parameters by a factor of 1.5 ($\alpha_s=0.6$, $\beta_s=0.45$, $c_s=1.2$), see Eqs. 13 and 15. The value of the center/surround ratio for the contour response computation was $\xi_{CS}=1.4$, see Eq. 16.

The number of orientation classes $N_\Omega$ was 12. This resulted in intervals of 15°. The orientation selectivity of the simple cell receptive field $v_{bar}$ was 40, see Eq. 18. This value was selected to yield 15° full-width at half maximum (FWHM). The length of the simple cell receptive field $L_{bar}$ was 4, see Eq. 18. For the remote, a broader orientation tuning curve of the remote ($v_{short}=20$, see Eq. 20), corresponding to FWHM≈20°. This ensured orientation sharpening.

The $\epsilon$ parameter was set to $10^{-6}$, see Eqs. 21 and 33. The value of the relative oriented edge threshold $\tau_{or}$ was 0.8, see Eq. 22.

The value of the orientation selectivity of the long range connections $v_{con}$ was 200, see Eq. 25, yielding FWHM of approximately 7°. This choice reflected higher detection reliability of illusory contours. The orientation enhancement takes into account a wide range of competing orientations in the spatial neighbourhood of the hypothesized contour ($v_{long}=1$, see Eq. 32), yielding a FWHM of about 90°.

The selected length (one standard deviation) of the long range connection $L_{con}$ was 16, see Eq. 25. The value of the relative illusory contour threshold $\tau_{ill}$ was 0.77, see Eq. 35. The cross-orientation inhibition parameters $P_{inh}$ and $\alpha_{inh}$ were 10 and 500, respectively, see Eqs. 28 and 30.

The illusory contour gain $g_{ill}$ was 0.3, see Eq. 42, and the gain coefficient $g_{rec}$ was 1.7, see Eq. 43.

Results

Figures 5A, 5B, 5C:
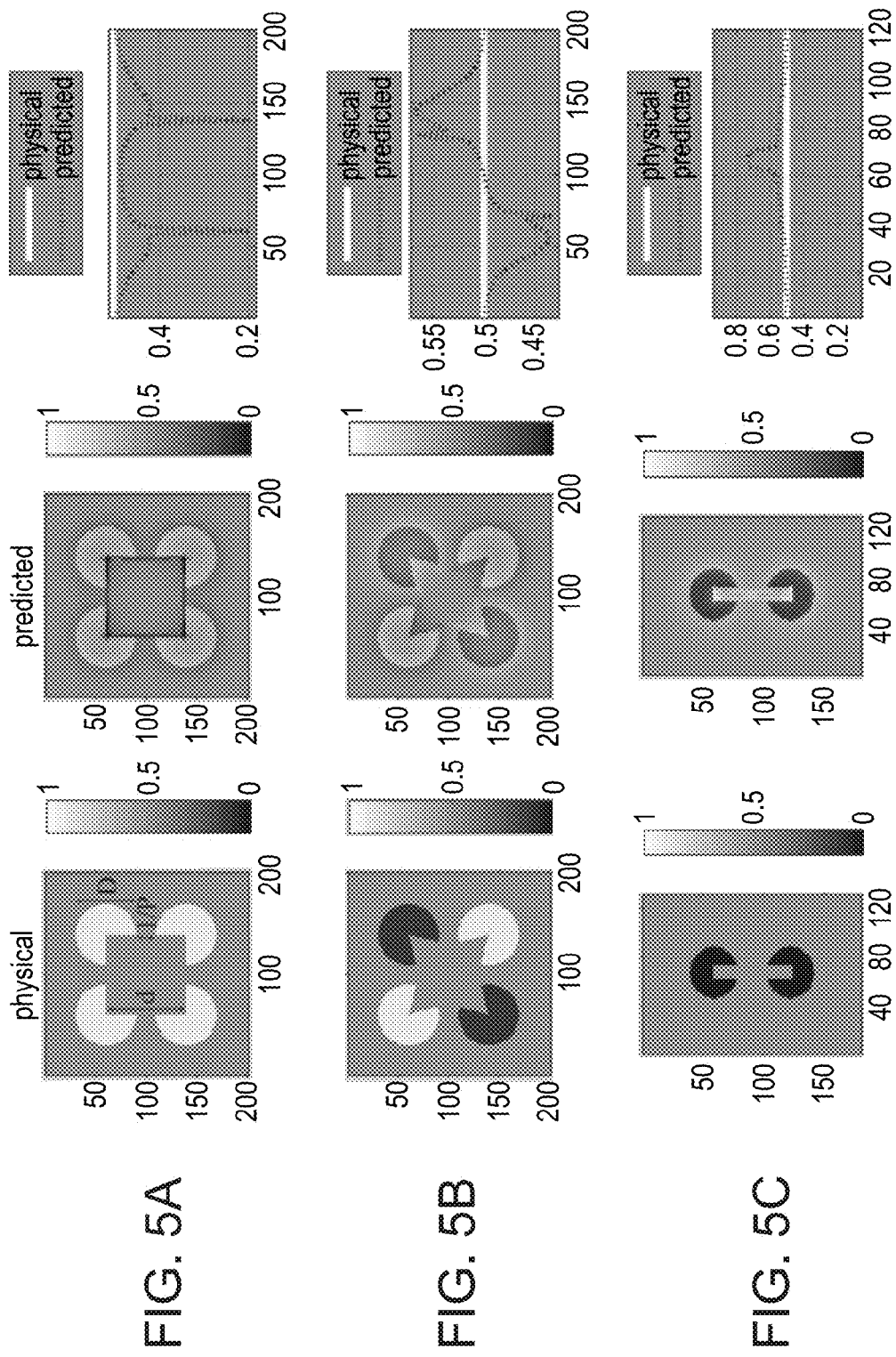
FIGS. 5A-C show predictions of the classical illusory contour effects, as identified according to some embodiments of the present invention.

FIGS. 5A-C show predictions of the classical illusory contour effects. FIG. 5A shows a Kanizsa square with white inducers, and its characteristics: proximity, P, inducer diameter, D and inner distance, d. FIG. 5B shows a Kanizsa square with Black and White inducers, and FIG. 5C shows illusory bar with black inducers. In FIGS. 5A-C the left column shows the input images, the middle column shows the predictions of the perceived brightness according to some embodiments of the present invention are shown in, and the right column shows a demonstration of the predictions along horizontal lines (Y=100, 95 and 90 for FIGS. 5A, 5B and 5C, respectively) of the vertical illusory contours (dashed black lines). Output pixel values higher than those of the corresponding input pixel (above 0.5 in ordinate) indicate an increase in the surface brightness, compared to that of its background.

The results show that the perceived contours are distinct and obtain the opposite polarity to that of adjacent inducing elements. In addition, the location of the identified contours is generally accurate, except for some spatial artifacts (e.g., contour tails inside the inducing elements, which derive mainly from the shape of the oriented masks, see Eq. 18.

FIGS. 6A-D shows predictions of some conditions for the perception illusory contours and characteristics of contour strength. FIG. 6A shows predictions to reduced relatability, FIG. 6B shows predictions to reduced contrast, FIG. 6C shows predictions to enhanced spatial interference and FIG. 6D shows predictions to changes in the support ratio D/d. The format of the left, middle and right columns of FIGS. 6A-D is the same as in FIGS. 5A-C. The left column corresponds to horizontal line at Y=100.

As shown, reduced relatability and contrast resulted in less clear contours (FIGS. 6A and 6B). The results additionally show that in the case of Kanizsa square cut-sectors that are distinct from the background spatial interference reduces the ability to identify illusory contour with (FIG. 6C, right column). The strength of the identified contours varies with D/d (FIG. 6D).

Figures 7A, 7B, 7C:
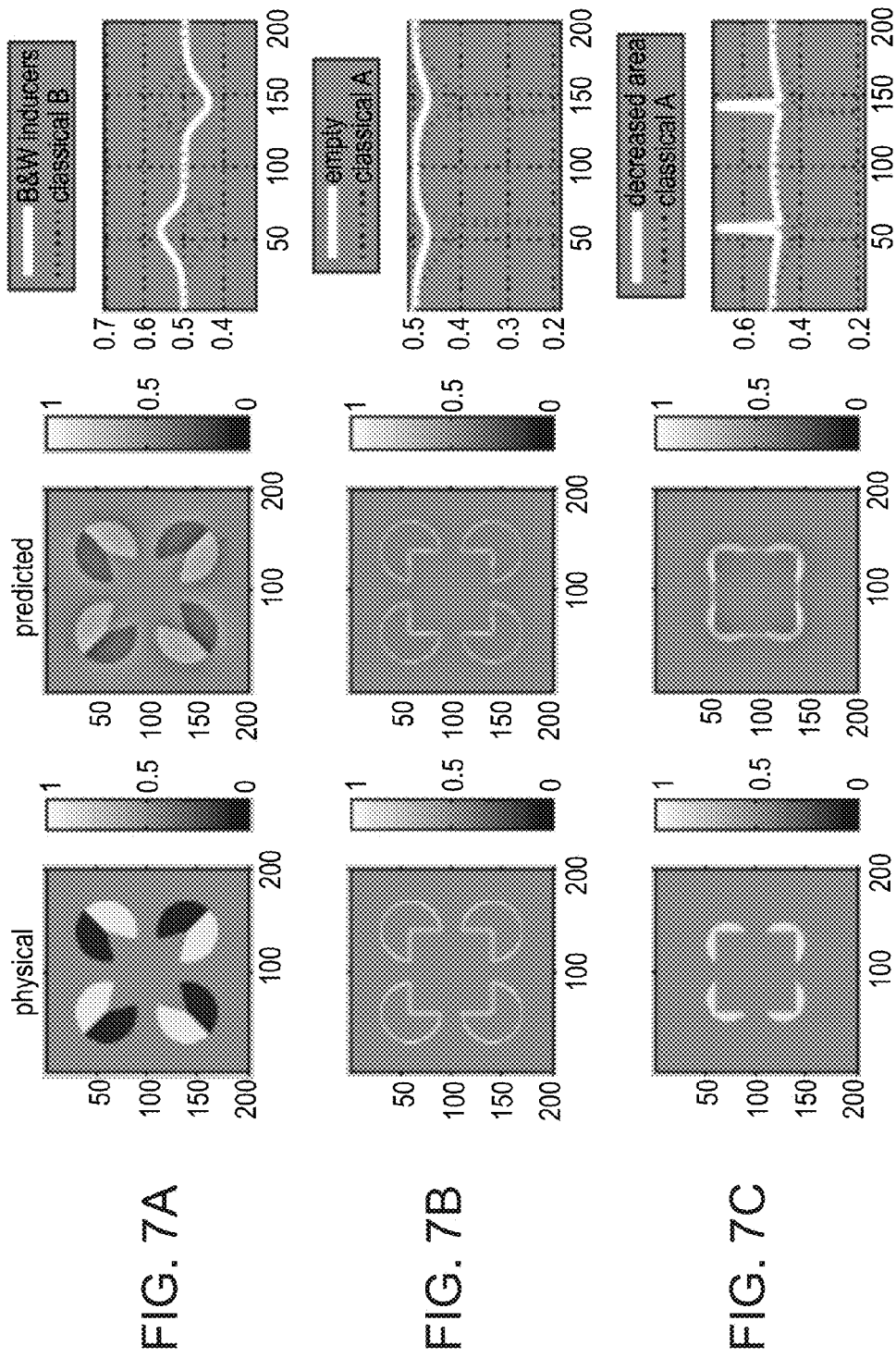
FIGS. 7A-C show the effect of suppressive stimulus conditions on the identification of illusory contours according to some embodiments of the present invention.

FIGS. 7A-C show predictions of the suppressive stimulus conditions. FIG. 7A shows a Kanizsa square with non-uniform inducers, FIG. 7B shows Kanizsa square with empty inducers, and FIG. 7C shows Kanizsa square with inducers of decreased area. The format of the left, middle and right columns of FIGS. 6A-D is the same as in FIGS. 5A-C. The left column corresponds to horizontal lines at Y=95 compared to the classical stimulus B (FIG. 7A), and Y=100 compared to the classical stimulus A (FIGS. 7B-C).

The model of the present embodiments predicts the disappearance of the illusory contours (FIG. 7A), in comparison with the prediction of the classical Kanizsa stimulus (FIG. 5B). In addition, the disappearance of the illusory contours has been predicted by the model of the present embodiments in response to a variant of the stimulus (FIG. 7B), in comparison with the prediction of the classical Kanizsa stimulus (FIG. 5A).

In FIG. 7C, the area of the inducers was decreased while maintaining their inner contours. An illusory contour that is brighter than the background has been predicted by the model of the present embodiments. Note that the trend of brighter contour was not predicted in the case of empty inducers (FIG. 7B), since the white contour in that case was intersected by the outer contour of the inducer, and thus was suppressed by the cross-orientation inhibition procedure.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of processing an image, comprising:
   decomposing the image into a plurality of different resolutions; and
   for each resolution, processing the image at said resolution to extract edge-orientation information;
   utilizing said edge-orientation information for identifying contours in the image;
   detecting spatial interference along contours using a local cross orientation signal or a function thereof;
   suppressing contribution of said contours; and
   transmitting at least said identified contours to a computer-readable medium.

2. The method according to claim 1, wherein said processing comprises processing the image using at least two adaptation procedures, each featuring a different curve shifting mechanism, and wherein said edge-orientation information is extracted separately for each adaptation procedure and for each resolution.

3. The method according to claim 2, wherein said at least two adaptation procedures comprises a first adaptation procedure based on image intensity values in said image, and a second adaptation procedure based on intensity values which are respectively complementary to said image intensity values.

4. The method according to claim 2, wherein each adaptation procedure features at least two saturation functions of image intensities.

5. The method according to claim 4, wherein each adaptation procedure comprises, for each picture-element of said image, a weighted subtraction between (i) a saturation function of intensity of said picture-element, and (ii) a saturation function of intensities of picture-elements surrounding said picture-element.

6. The method according to claim 4, wherein each adaptation procedure comprises, for each picture-element of said image, a weighted subtraction between (i) a saturation function of intensities of a central region of picture-elements including said picture-element, and (ii) a saturation function of intensities of picture-elements surrounding said central region of picture-elements.

7. The method according to claim 1, wherein said extraction of said edge-orientation information comprises classifying edges in the image into a set of orientation classes using a set of respective elongated masks.

8. The method according to claim 7, wherein each elongated mask of said set is expressed using a powered cosine or a powered sine of a relative orientation angle.

9. The method according to claim 7, further comprising, for each orientation class, enhancing contrast of at least one edge within said class relative to image regions neighboring said edge, thereby providing at least one enhanced edge.

10. The method according to claim 9, wherein said enhancement comprises calculating a divisive gain.

11. The method according to claim 9, further comprising subjecting said edge to a thresholding procedure selected for identifying salient edges in the image.

12. The method according to claim 9, further comprising employing a long-range connection detection procedure.

13. The method according to claim 12, wherein said long-range connection detection procedure comprises convolution of said enhanced edge with an elongated mask.

14. The method according to claim 13, wherein said elongated mask of said long-range connection detection procedure is characterized by a length which is at least two times larger than a length characterizing said extraction of said edge-orientation information.

15. The method according to claim 12, further comprising employing an adaptation procedure for enhancing salient long-range connections and suppressing non-salient long-range connections.

16. The method according to claim 1, wherein the image is an image of the interior of a living body and said edge information is used for identifying body part features in said body.

17. The method according to claim 16, wherein said body part features comprise blood vessels.

18. The method according to claim 16, wherein said body part features comprise abnormal cell lining.

19. The method according to claim 1, wherein the image is an image of the interior of the esophagus and said edge information is used for diagnosing the likelihood of Barrett's disease.

20. The method according to claim 1, wherein the image is a mammogram and said edge information is used for identifying mammography classes.

21. The method according to claim 1, wherein the image is a mammogram and said edge information is used for identifying a spiculated mass.

22. The method according to claim 20, wherein said identification is done automatically.

23. The method according to claim 1, wherein the image is an image of at least a bony tissue and said edge information is used for extracting geometrical data of said bony tissue.

24. The method according to claim 1, wherein the image is an image of the GI tract, and said edge information is used for diagnosing a GI tract disease or pathology.

25. The method according to claim 1, wherein the image is an image of the GI tract, and said edge information is used for diagnosing a disease or pathology selected from the group consisting of esophageal carcinoma, peptic ulcer disease, colorectal carcinoma, an inflammatory bowel disease (e.g., ulcerative colitis and Crohn's disease), constipation, gastroesophageal reflux disease, irritable bowel syndrome.

26. The method according to claim 19, wherein said diagnosing is done automatically.

27. A system for processing an image, comprising a processor configured for receiving the image, decomposing the image into a plurality of different resolutions, processing the image so as to extract edge-orientation information for each resolution, detecting spatial interference along contours using a local cross orientation signal or a function thereof, suppressing contribution of said contours, and utilizing said edge-orientation information for identifying contours in the image.

28. A computer software product, comprising a Non-transitory computer-readable medium in which program instructions are stored, which instructions, when read by a computer, cause the computer to receive an image, to decompose the image into a plurality of different resolutions, to process the image so as to extract edge-orientation information for each resolution, to detect spatial interference along contours using a local cross orientation signal or a function thereof, to suppress contribution of said contours, and to utilize said edge-orientation information for identifying contours in the image.

* * * * *